United States Patent Office 3,850,964
Patented Nov. 26, 1974

3,850,964
METHOD FOR MAKING AROMATIC
BIS(ETHER ANHYDRIDE)S
Frank J. Williams III, Scotia, N.Y., assignor to
General Electric Company
No Drawing. Filed Mar. 30, 1973, Ser. No. 346,471
Int. Cl. C07d 7/18
U.S. Cl. 260—345.2     8 Claims

ABSTRACT OF THE DISCLOSURE

A method is provided for making aromatic bis(ether anhydride)s by using alkali metal diphenoxides with halo- or nitro-substituted aromatic anhydrides.

---

The present invention relates to a method for making aromatic bis(ether anhydride)s by effecting contact between an alkali diphenoxide and a halo- or nitro-substituted aromatic anhydride.

As shown in copending application Ser. No. 346,473 of Darrell Heath and Tohru Takekoshi, filed Mar. 30, 1973, and assigned to the same assignee as the present invention, aromatic bis(ether anhydride) can be made from N-substituted aromatic bis(etherphthalimide) by a stepwise procedure involving the conversion of the bis-imide to the corresponding tetra-acid salt, the acidification of the salt to the tetra-acid and the dehydration of the tetra-acid to the dianhydride. This stepwise procedure provides high yields of the aromatic bis(ether anhydride)s. High yields are achieved because alkali diphenoxide can be employed directly with N-substituted nitrophthalimide without a significant degree of ring opening occurring.

The present invention is based on the discovery that diphenoxides also can be contacted directly with certain aromatic anhydrides having particular diphenoxide displaceable functional groups, such as halophthalic anhydrides and nitronaphthalic anhydrides to produce attractive yields of aromatic bis(ether anhydride)s. More particularly there can be employed in the practice of the invention to make aromatic bis(ether anhydride)s, halophthalic anhydrides of the formula, (I)
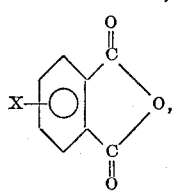

and naphthalic anhydrides of the formula, (II)
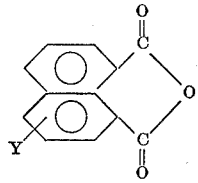

where X is a halogen radical selected from the class consisting of fluoro, chloro, bromo, and iodo, and Y is a radical selected from the class consisting of nitro and X radicals. It has been found that in instances where lower yields of aromatic bis(ether anhydride)s can be tolerated, X also can be nitro.

There is provided by the present invention, a method for making aromatic bis(ether anhydride)s, which comprises, (1) effecting reaction in the presence of organic solvent between an alkali diphenoxide of the formula, (III)     M—O—R—O—M, and an organic anhydride selected from the class consisting of formulas I and II, and (2) recovering from (1), aromatic bis(ether anhydride)

where X and Y are as previously defined, M is an ion of an alkali metal selected from the class consisting of sodium, potassium, lithium, etc., and R is a divalent aromatic organic radical having from 6–30 carbon atoms.

Included by R are aromatic organic radicals selected from the class consisting of (a) the following divalent organic radicals:

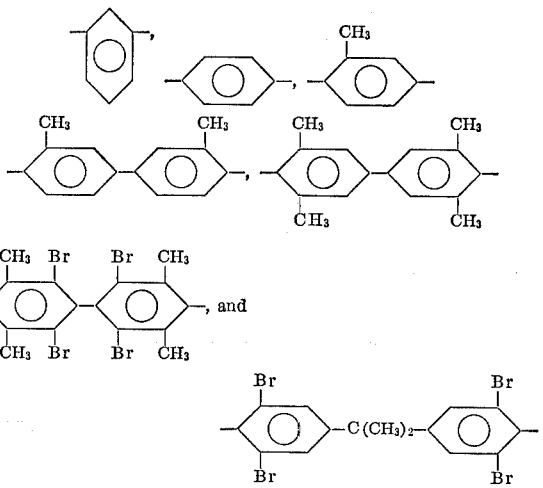

and (b) divalent organic radicals of the general formula

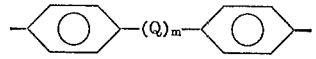

where Q is a member selected from the class consisting of divalent radicals of the formulas $$-C_yH_{2y}-, -\overset{O}{\underset{\parallel}{C}}-, -\overset{O}{\underset{\parallel}{\underset{O}{S}}}-, -O- \text{ and } -S-,$$

where $m$ is 0 or 1, $y$ is a whole number from 1 to 5.

Preferably, there are included by the X-substituted phthalic anhydrides of formula I, 3-fluorophthalic anhydride and 4-fluorophthalic anhydride; the phthalic anhydrides of formula I also include 3-chlorophthalic anhydride, 4-chlorophthalic anhydride, etc. There are included by the naphthalic anhydrides of formula II, compounds where Y can be in the 2 or 4 position such as 2-nitronaphthalic anhydride, 4 - nitronaphthalic anhydride, 2-chloronaphthalic anhydride, 4 - chloronaphthalic anhydride, etc.

Included by the aromatic bis (ether anhydride)s provided by the method of the invention are compounds having the formulas, (IV)
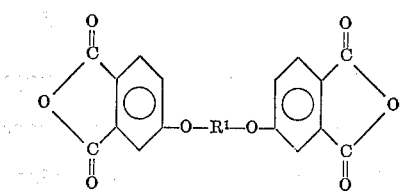

(V)
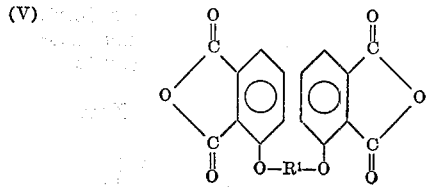

(VI) 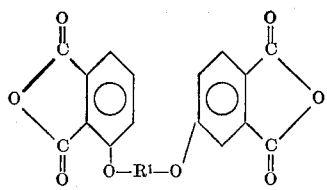

(VII) 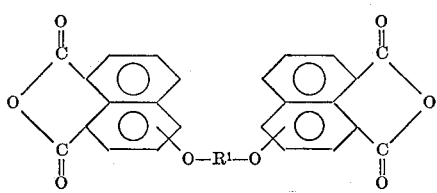

where R¹ is

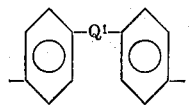

and Q¹ is selected from

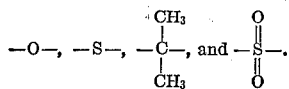

Dianhydrides included by formula V are for example 2,2-bis[4-(2,3-dicarboxyphenoxy)phenyl]
   propane dianhydride;
4,4'-bis(2,3-dicarboxyphenoxy)diphenyl ether
   dianhydride;
1,3-bis(2,3-dicarboxyphenoxy)benzene dianhydride;
4,4'-bis(2,3-dicarboxyphenoxy)diphenyl sulfide
   dianhydride;
1,4-bis(2,3-dicarboxyphenoxy)benzene dianhydride;
4,4'-bis(2,3-dicarboxyphenoxy)diphenylsulfone
   dianhydride;
etc.

Dianhydrides included by formulas VI and VII are, for example, 2,2-bis[4-(3,4-dicarboxyphenoxy)phenyl]propane
   dianhydride;
4,4'-bis(3,4-dicarboxyphenoxy)diphenyl ether
   dianhydride;
4,4'-bis(3,4-dicarboxyphenoxy)diphenyl sulfide
   dianhydride;
1,3-bis(3,4-dicarboxyphenoxy)benzene dianhydride;
1,4-bis(3,4-dicarboxyphenoxy)benzene dianhydride;
4,4'-bis(3,4-dicarboxyphenoxy)diphenylsulfone
   dianhydride;
4-(2,3-dicarboxyphenoxy)-4'(3,4-dicarboxyphenoxy-
   2,2-diphenyl propane dianhydride,
etc.

In addition to the above phthalic anhydrides there also is included naphthalic anhydrides of formula VII such as 2,2-bis[4-(4,5-dicarboxynaphthoxy)phenyl]propane
   dianhydride;
2,2-bis[4-(2,3-dicarboxynaphthoxy)phenyl]propane
   dianhydride;
4,4'-bis(4,5-dicarboxynaphthoxy)diphenyl ether
   dianhydride;
1,3-bis(4,5-dicarboxynaphthoxy)benzene dianhydride;
1,3-bis(2,3-dicarboxynaphthoxy)benzene dianhydride;
4,4'-bis(4,5-dicarboxynaphthoxy)diphenyl sulfide
   dianhydride;
4,4'-bis(4,5-dicarboxynaphthoxy)diphenylsulfone
   dianhydride;
4-(2,3-dicarboxynaphthoxy)-4'(4,5-dicarboxy-
   phenoxy)-2,2-diphenyl propane dianhydride.

Included by the alkali metal salts of the above diphenoxides of formula III are sodium and potassium salts of the following dihydric phenols 2,2-bis-(2-hydroxyphenyl)propane;
2,4'-dihydroxydiphenylmethane;
bis-(2-hydroxyphenyl)methane;
2,2-bis-(4-hydroxyphenyl)propane hereinafter identified as "bisphenol-A" or "BPA";
1,1-bis-(4-hydroxyphenyl)ethane;
1,1-bis-(4-hydroxyphenyl)propane;
2,2-bis-(4-hydroxyphenyl)pentane;
3,3-bis-(4-hydroxyphenyl)pentane;
4,4'-dihydroxybiphenyl;
4,4'-dihydroxy-3,3',5,5'-tetramethylbiphenyl;
2,4'-dihydroxybenzophenone;
4,4'-dihydroxybenzophenone;
4,4'-dihydroxydiphenyl sulfone;
2,4'-dihydroxydiphenyl sulfone;
4,4'-dihydroxydiphenyl sulfoxide;
4,4'-dihydroxydiphenyl sulfide;
etc.

In addition to the above described "Group A" dihydric phenols, there also can be employed in the present invention, aromatic bis(ether anhydrides) derived from the alkali metal salts of the following "Group B" dihydric phenols:

hydroquinone;
resorcinol;
3,4'-dihydroxydiphenylmethane;
4,4'-dihydroxybenzophenone; and
4,4'-dihydroxydiphenyl ether.

The alkali metal diphenoxides of formula III can be employed as a preform or can be generated in situ. The preform is preferably made by azeotropically distilling water from an aqueous mixture of an alkali hydroxide, dihydric phenol and a hydrocarbon solvent to render the preform substantially anhydrous. Two stoichiometric equivalents of alkali hydroxide, per equivalent of dihydric phenol are employed.

In the practice of the invention, the aromatic bis(ether anhydride) can be made by effecting reaction between the alkali diphenoxide, and the "aromatic anhydride," where hereinafter will signify organic anhydrides of formula I or II, and the alkali diphenoxide.

It has been found that about 2 moles of aromatic anhydride, per mole of the alkali diphenoxide can be employed.

The reaction between the diphenoxide and the aromatic anhydride preferably is conducted under an inert atmosphere such as nitrogen and under substantially anhydrous conditions. Suitable organic solvents which can be utilized to facilitate the formation of the aromatic bis(ether anhydride) are aprotic dipolar organic solvents and include, for example, dimethylformamide, sulfolane, dimethylacetamide, dimethyl sulfoxide, hexa-methylphosphoric triamide, etc. Temperatures which can be employed are, for example, from 25° C. to 170° C. and preferably from 100° C. to 150° C.

Reaction times can vary from 5 minutes or less to 16 hours or more depending upon the temperature at which the reaction is conducted, degree of agitation, etc. It has been found, for example, that in certain instances, reflux conditions are preferred for achieving the maximum yield of product.

Recovery of product can be achieved at the termination of the reaction by pouring the reaction mixture into dilute mineral acid such as hydrochloric acid and ice. The resulting precipitate can be recovered by filtration, etc.

The aromatic dianhydrides made by the method of the present invention can be employed as intermediates for making polymers, such as polyimides by reaction with organic diamines. In addition, the dianhydride can be used as curing agents for epoxy resins, intermediates for making polyester resins.

In order that those skilled in the art will be better able to practice the invention, the following examples are given by way of illustration and not by way of limitation. All parts are by weight.

EXAMPLE 1

The disodium salt of bisphenol-A was prepared from a mixture of 0.7 parts of 50% aqueous sodium hydroxide solution and 1 part bisphenol-A. The salt was made anhydrous by azeotropically removing water from the reaction mixture using benzene.

A mixture of this salt, 2.1 parts of 4-nitronaphthalic anhydride and about 15 parts of anhydrous dimethylformamide was stirred under a nitrogen atmosphere for one hour at room temperature. The entire reaction mixture was poured into water and the resulting precipitate was collected and dried to give 1.6 parts (60% yield) of a tan powder. Recrystallization from acetic acid gave a sample m.p. 258–259° C. Based on the method of preparation and infrared and NMR spectra, the product was 2,2-bis[4 - (4,5 - dicarboxynaphthoxy)phenyl]propane dianhydride.

EXAMPLE 2

A mixture of 0.4744 g. (0.0017 mole) of disodium salts of bisphenol-A, 0.5788 g. (0.035 mole) of 3-fluorophthalic anhydride, and 11 ml. of anhydrous dimethylformamide was stirred under a nitrogen atmosphere for 3 hours at a temperature of about 170° C. The mixture was then allowed to cool from room temperature. The mixture was added to 150 ml. of a 1.2 N hydrochloric acid-ice mixture. There was obtained a white product which was collected by filtration. The product was washed with 1.2 N hydrochloric acid and dried to give 0.8077 g. of crude material representing a 91% yield. The product was then recrystallized from an acetic acid-acetic anhydride mixture resulting in a material having a melting point of 181.5–183° C. Based on method of preparation and infrared analysis, the product was 2,2-bis[4-(2,3-dicarboxyphenoxy)phenyl]propane dianhydride.

EXAMPLE 3

In accordance with the procedure of Example 2, a mixture of 3-fluorophthalic anhydride and the sodium salt of 4,4'-dihydroxybiphenyl utilizing a 2:1 molar ratio of anhydride to salt, was stirred in an oil bath at 170° C. under a nitrogen atmosphere for 1¼ hours. The mixture was then allowed to cool to room temperature. A yellow product was obtained in 51% yield. The product had a melting point of 281–283° C. Based on method of preparation and infrared analysis the product was 4,4'-bis(2,3-dicarboxyphenoxy)biphenyl dianhydride.

EXAMPLE 4

A mixture of 1 part of the disodium salt of bisphenol-A, 1.22 parts of 4-fluorophthalic anhydride, and 14 parts of anhydrous dimethylformamide were stirred under a nitrogen atmosphere for 2 hours at reflux. The mixture was cooled to room temperature and added to 140 parts of 1.2 N HCl mixed with ice. The resulting white precipitate was collected and dried to give 1.6 parts (85% yield) of 2,2-bis[4-(3,4-dicarboxyphenoxy)phenyl]propane dianhydride. Recrystallization of a sample from tolueneacetic anhydride gave material with a m.p. 186–188° C. The product was identified from its infrared and proton and carbon NMR spectra.

What I claim as new and desire to secure by Letters Patent of the United States is:

1. A method for making aromatic bis(ether anhydride)s which comprises, (1) effecting reaction between an alkali diphenoxide of the formula

M—O—R—O—M, and an aromatic anhydride selected from the class consisting of

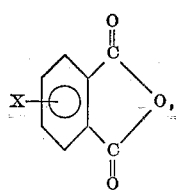

and

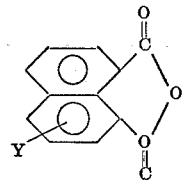

(2) recovering from (1), said aromatic bis(ether anhydride), where X and Y are selected from the class consisting of nitro and halogen radicals, M is an ion of an alkali metal, and R is a divalent aromatic radical having from 6–30 carbon atoms and selected from the class consisting of

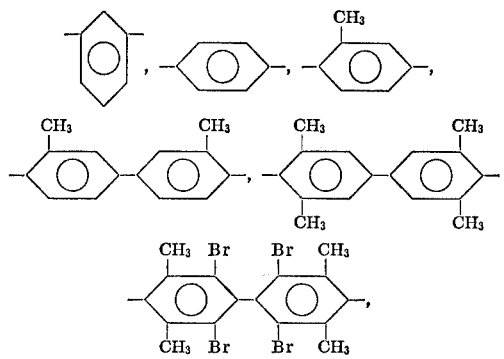

and

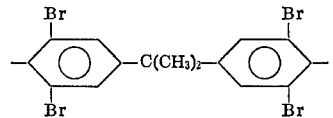

and (b) divalent organic radicals of the formula

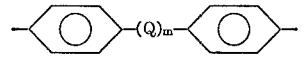

where Q is a member selected from the group consisting of divalent radicals of the formulas

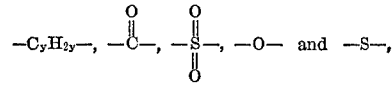

where —m is 0 or 1, y is a whole number from 1 to 5.

2. A method in accordance with claim 1 where the organic anhydride is 3-fluorophthalic anhydride.

3. A method in accordance with claim 1 where the organic anhydride is 4-fluorophthalic anhydride.

4. A method in accordance with claim 1 where the aromatic anhydride is 4-nitro-1,8-naphthalic anhydride.

5. A method in accordance with claim 1 where the diphenoxide is an alkali metal salt of bisphenol-A.

6. A method in accordance with claim 1 where the diphenoxide is an alkali metal salt of 4,4'-dihydroxy biphenyl.

7. A compound of the formula

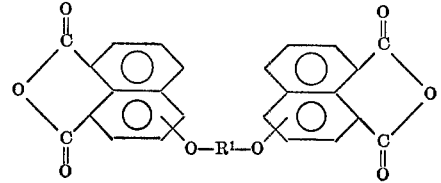

where R¹ is
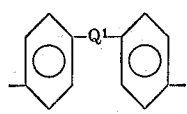
and Q¹ is selected from
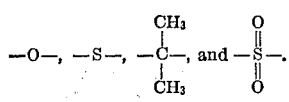
8. The compound 2,2-bis[4-(4,5-dicarboxynaphthoxy)-phenyl]propane dianhydride.
References Cited
UNITED STATES PATENTS
3,519,652   7/1970   Fitzmaurice et al. __ 260—345.2
JOHN M. FORD, Primary Examiner
U.S. Cl. X.R.
260—346.3, 830 R